J. W. REDDING.
ROCK CLEARING MACHINE.
APPLICATION FILED MAR. 2, 1912. RENEWED FEB. 10, 1915.
1,134,226.
Patented Apr. 6, 1915.
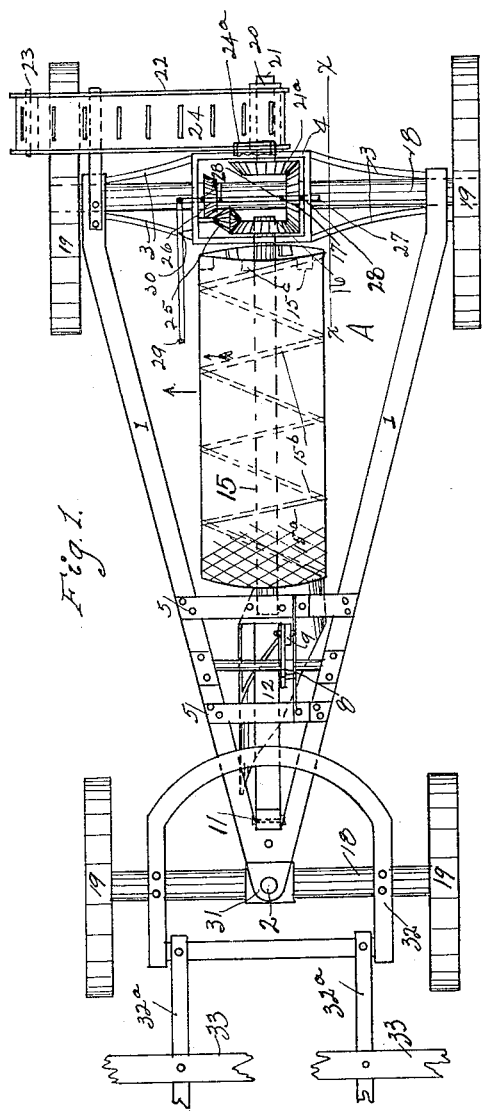
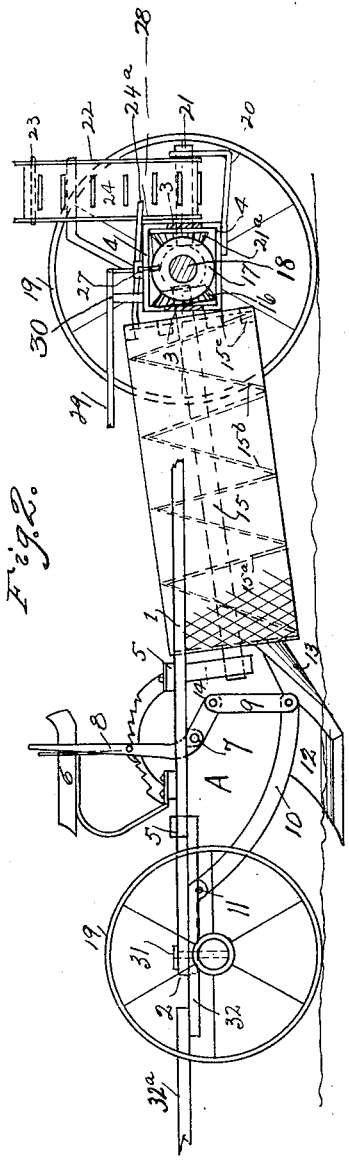

UNITED STATES PATENT OFFICE.

JOHN W. REDDING, OF SEATTLE, WASHINGTON.

ROCK-CLEARING MACHINE.

1,134,226. Specification of Letters Patent. Patented Apr. 6, 1915.

Application filed March 2, 1912, Serial No. 681,271. Renewed February 10, 1915. Serial No. 7,370.

*To all whom it may concern:*

Be it known that I, JOHN W. REDDING, a citizen of the United States, and a resident of Seattle, in the county of King and State of Washington, have invented certain new and useful Improvements in Rock-Clearing Machines, of which the following is a specification.

The principal object of this invention is to provide a machine of the character indicated, which is simple, strong and durable, of inexpensive construction, and which, when drawn over the surface of rocky soil, will plow the same and at the same time automatically lift the rocks from the soil, separate the soil from the rocks and convey the latter into a separate vehicle moving along side of the device, or, if desired, collect and deposit the rocks in a well defined row to be afterward removed.

The invention will be fully described in the following specification, and shown in the accompanying drawings, in which—

Figure 1 is a plan view of my device with the seat removed and other parts broken away. Fig. 2 is a side elevation with one of the wheels removed, and partly in section on the line $x$—$x$ at Fig. 1.

Referring now more particularly to the drawings, A designates in a general way the frame of the device which is made up of the side stringers 1 converging at 2 and having the members 3 projecting inwardly from their spreading ends. Supported by, and secured to, the inner ends of the members 3 is the crate like frame 4. Near the apex of the frame A are the cross timbers 5 on which is mounted the seat 6, at one side of which is pivoted at 7, the lever 8 connected to which is the link 9 which is also connected to one end of the lever 10, which is pivoted at 11 to the frame A. To the lower side of the lever 10 is secured the plow 12 which has the upwardly curving extension 13. Extending rigidly from one of the cross timbers 5 is the timber 14 in the lower end of which is revolubly mounted one end of the shaft 15, which inclines upwardly and has its opposite end similarly mounted in one side of the frame 4. To the upwardly inclined end of the shaft 15 is secured the miter gear 16 which meshes with the similar gear 17, keyed to the rear axle 18, which is integral with the wheels 19 and revolves in suitable journal bearings in the frame A. Secured to the shaft 15 is the cylindrical sieve 15$^a$, around the internal surface of which runs the worm 15$^b$. At the upper end of the sieve 15$^a$ and around its inner circular surface, are the cups 15$^c$. Extending rearwardly from the frame 4 is the arm 20 which is bent upwardly, as shown, and which revolubly supports one end of the stub shaft 21. The opposite end of the stub shaft 21 is revolubly mounted in the frame 4 and has the miter gear 21$^a$ normally meshing with the gear 17. Between the upwardly bent end of the arm 20 and the frame 4 is the conveyer frame 22 through the lower end of which loosely passes stub shaft 21, and through its upper end passes the roller 23; the conveyer belt 24 passes around over the roller 23 and the stub shaft 21, and leading to it from the sieve 15$^a$, is the chute 24$^a$ (broken away in Fig. 1). Mounted upon the frame 4 is the double faced pinion 25, one face of which constantly meshes with the miter gear 16, as shown in Fig. 1, and its other face is adapted to mesh with the miter gear 26 which is keyed to the axle 18. Mounted to slide longitudinally in the frame 4 is the bar 27 projecting downwardly from which are the fingers 28 which straddle the gears 17 and 26, one finger on each side of each gear. Pivoted to one end of the bar 27 is one end of the lever 29, pivoted at 30, to the frame 4, the opposite end of which may extend forwardly to the seat 6. Frame A is pivotally connected to the front axle by the king bolt 31 and to the hound 32 are secured, by means of the links 32$^a$, the double trees 33 for the draft animals.

Without further description it is believed that the operation of my device will be clear to others. By means of the ratchet lever 8 the plow 12 is adjusted to cut a furrow of a depth suitable to the condition of the soil to be dealt with. As the device is drawn along, the soil, as it leaves the plow 12, instead of being thrown over upon the ground in the usual manner, is diverted gradually, by the easy curve of the extension 13, into the lower end of the sieve 15$^a$, which, through the pinion 16 of its central shaft 15, and pinion 17 upon the axle 18, is rotated as the traction wheels 19 revolve. As the soil and rocks are received into the lower end of the sieve the soil is sifted through the mesh of the sieve and falls to the ground while the rocks are carried upwardly by the worm 15$^b$ until they reach its extreme upper end where they collect in the cups 15ᶜ. As the sieve rotates the cups are inverted and empty the rocks upon the chute 24ᵃ, down which they roll to the conveyer belt 24 which is kept moving upwardly, through the miter gear 21ᵃ and stub shaft 21, which transmit power from the axle 18. As the rocks leave the upper end of the conveyer belt 24 they fall into a suitable vehicle, such as an ordinary dump wagon moving alongside of my device.

If the soil be found, in places, too thickly filled with rocks, so that the draft becomes too heavy upon the animals the plow 12 is raised as above described, and the free end of the lever 29 moved in the direction of the arrow in Fig. 1, which causes the bar 27 to slide in the opposite direction, the straddling fingers 28 carrying the wheel 17 out of engagement with the wheel 16 and throwing the wheel 26 into engagement with one face of the pinion 25, which causes the sieve 15ᵃ to revolve more slowly, as the gear 26 is of smaller pitch than the gear 17; and at the same time throws the wheel 21ᵃ out of engagement with the wheel 17 and allows the rocks to fall in a well defined row behind the device, from which they may be afterward immediately collected and removed.

Modifications in the general arrangement and details of the construction herein described are possible without departing from the spirit and scope of the invention, and I do not therefore desire to be limited to that precise form.

What I claim as new and desire to protect by Letters Patent is—

A rock clearing machine comprising, in combination, a frame, traction wheels therefor, a plow swung beneath said frame, a lever for adjusting said plow to regulate its thrust, a gradually curved extension from said plow to conduct the earth upwardly and rearwardly, an upwardly inclined cylindrical sieve rotatable longitudinally, the lower end of which communicates with said curved extension, a worm within said sieve to elevate the rock, cups around the rear edge of said sieve wherein the rocks are collected, an elevator belt, means for conducting the rocks from said cups to said belt, means for transmitting motion from said traction wheels to said sieve, and means for transmitting said motion to said elevator belt and means for regulating said power transmission means so that said sieve is caused to rotate at varying speeds and the movement of said elevator belt is stopped.

JOHN W. REDDING.

Witnesses:
FRED P. GORIN,
H. RUPERT.

Copies of this patent may be obtained for five cents each, by addressing the "Commissioner of Patents Washington, D. C."